United States Patent
Rebinger et al.

(10) Patent No.: US 9,738,138 B2
(45) Date of Patent: Aug. 22, 2017

(54) VEHICLE AIR CONDITIONER WITH A REFRIGERANT CIRCUIT

(71) Applicant: Audi AG, Ingolstadt (DE)

(72) Inventors: Christian Rebinger, München (DE); Dirk Schroeder, Manching (DE); Klaus Strasser, Eichstätt (DE); Ruben Gonzalez, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 257 days.

(21) Appl. No.: 14/657,513

(22) Filed: Mar. 13, 2015

(65) Prior Publication Data

US 2015/0266358 A1    Sep. 24, 2015

(30) Foreign Application Priority Data

Mar. 19, 2014  (DE) .................. 10 2014 003 908

(51) Int. Cl.
*B60H 1/32* (2006.01)
*B60H 1/00* (2006.01)
(Continued)

(52) U.S. Cl.
CPC .......... *B60H 1/323* (2013.01); *B60H 1/00885* (2013.01); *B60H 1/3219* (2013.01);
(Continued)

(58) Field of Classification Search
CPC .... B60H 1/3204; B60H 1/3205; B60H 1/323; B60H 2001/3251; B60H 2001/326;
(Continued)

(56) References Cited

U.S. PATENT DOCUMENTS 2,751,143 A * 6/1956 Biehn .................. F25B 49/022
                                                     417/278
3,303,663 A   2/1967 Miller et al.
(Continued)

FOREIGN PATENT DOCUMENTS

CN    1209533 A    3/1999
CN    1231242 A    10/1999
(Continued)

OTHER PUBLICATIONS

Chinese Search Report dated Nov. 2, 2016 with respect to counterpart Chinese patent application 201510116460.5.
(Continued)

*Primary Examiner* — Jonathan Bradford
(74) *Attorney, Agent, or Firm* — Henry M. Feiereisen LLC

(57) ABSTRACT

A vehicle air conditioner with a refrigerant circuit has as components at least one evaporator, a refrigerant compressor, a refrigerant condenser, an expansion valve associated with the evaporator and at least one heat exchanger with an associated expansion valve for coupling with a coolant circuit of a heat source, wherein the components are connected by a refrigerant line. A refrigerant container is provided which is connected on the high-pressure side of the refrigerant compressor with the refrigerant line and has a refrigerant-receiving chamber with a controllable volume, and a control unit is provided with which the volume of the chamber of the refrigerant container is controlled as a function of operating parameters of the refrigerant circuit. Alternatively, the refrigerant container is connected on the high-pressure side of the refrigerant compressor with the refrigerant line by way of a branch line.

3 Claims, 2 Drawing Sheets

(51) Int. Cl.
  *B60L 11/18*    (2006.01)
  *F25B 45/00*    (2006.01)
  *F25B 41/00*    (2006.01)
  *F25B 49/02*    (2006.01)
  *F25B 5/02*     (2006.01)

(52) U.S. Cl.
  CPC ........ *B60L 11/1874* (2013.01); *F25B 41/003* (2013.01); *F25B 45/00* (2013.01); *F25B 49/02* (2013.01); *B60H 1/00892* (2013.01); *B60H 2001/3266* (2013.01); *B60H 2001/3286* (2013.01); *B60H 2001/3297* (2013.01); *F25B 5/02* (2013.01); *F25B 2400/16* (2013.01); *F25B 2400/19* (2013.01); *F25B 2500/23* (2013.01); *F25B 2500/24* (2013.01); *F25B 2600/2523* (2013.01); *F25B 2700/195* (2013.01); *F25B 2700/21163* (2013.01)

(58) Field of Classification Search
  CPC .... B60L 11/1874; F25B 43/006; F25B 45/00; F25B 2345/003; F25B 2500/23; F25B 2500/24; F25B 2600/05
  See application file for complete search history.

(56) References Cited

U.S. PATENT DOCUMENTS

| | | |
|---|---|---|
| 4,841,739 A | 6/1989 | Wallner |
| 2008/0289346 A1* | 11/2008 | Gernemann ............ F25B 9/008 62/222 |
| 2010/0025125 A1 | 2/2010 | Bienert et al. |
| 2012/0318000 A1 | 12/2012 | Schröeder et al. |

FOREIGN PATENT DOCUMENTS

| | | |
|---|---|---|
| CN | 203478665 U | 3/2014 |
| DE | 37 01 086 | 8/1988 |
| DE | 37 21 388 | 12/1988 |
| DE | 102009035329 | 2/2010 |
| DE | 102011118162 | 5/2013 |
| EP | 0 274 727 | 7/1988 |
| JP | 2013-256288 A | 12/2013 |
| WO | WO2013/017936 | 2/2013 |

OTHER PUBLICATIONS

English translation of Chinese Search Report issued on Nov. 2, 2016 with respect to counterpart Chinese patent application 201510116460.5.

European Search Report with respect to counterpart European patent application EP 15 00 0278.

Translation of European Search Report with respect to counterpart European patent application EP 15 00 0278.

\* cited by examiner

VEHICLE AIR CONDITIONER WITH A REFRIGERANT CIRCUIT

CROSS-REFERENCES TO RELATED APPLICATIONS

This application claims the priority of German Patent Application, Serial No. 10 2014 003 908.0, filed Mar. 19, 2014, pursuant to 35 U.S.C. 119(a)-(d), the content of which is incorporated herein by reference in its entirety as if fully set forth herein.

BACKGROUND OF THE INVENTION

The present invention relates to a vehicle air conditioner with a refrigerant circuit.

The following discussion of related art is provided to assist the reader in understanding the advantages of the invention, and is not to be construed as an admission that this related art is prior art to this invention.

The use of refrigerant circuits in vehicle air conditioners is known in the art, with some variants providing a 2-evaporator system, namely a front evaporator and a rear system evaporator. The need for a necessary active refrigerant in the refrigerant circuit varies depending on the interconnection and the active operation of the respective heat transfer.

Electrified vehicles typically require, in addition to the evaporator for the interior or front, a separate cooling circuit for conditioning and temperature control of the energy store typically implemented as a high-voltage battery. Such a coolant circuit is coupled with the refrigerant circuit by way of a heat exchanger, wherein such a heat exchanger is in turn also implemented as an evaporator for cooling an air flow or as a so-called chiller for cooling water.

The use of the refrigerant circuit of the vehicle air conditioner in a heat pump mode for heating the passenger compartment is also known. When operating as a heat pump, the refrigerant circuit is able to heat an air flow or a water flow and discharge this heat to the air of the passenger compartment. The quantity of active refrigerant in the refrigerant circuit required for optimal operation varies in this case also depending on the operation of the vehicle air conditioner, i.e. whether heating or cooling is performed or how many heat exchangers are actively operated.

The different modes of operation of such air conditioners may require different refrigerant charges as an optimum depending on the interconnection of the components.

For example, in a generic vehicle air conditioner, a refrigerant may be suctioned out of the non-active areas and to active areas of the refrigerant circuit by forming a connection between the non-active regions and the active low-pressure side. Alternatively, a connection may be formed between the non-active areas and the high-pressure side for expelling refrigerant from the non-active areas of the refrigerant circuit. In specific operating modes, excess refrigerant may be moved from the active regions of the refrigerant circuit to the non-active areas to regulate the active refrigerant charge by suctioning and removing refrigerant from inactive areas of the refrigerant circuit or components thereof.

It would therefore be desirable and advantageous to obviate prior art shortcomings and to provide an improved solution wherein the required quantity of refrigerant can be provided for each operating mode of the vehicle air conditioner.

SUMMARY OF THE INVENTION

According to one aspect of the present invention, a vehicle air conditioner with a refrigerant circuit includes as components at least an evaporator, a refrigerant compressor, a refrigerant condenser, an expansion valve associated with the evaporator and at least one heat exchanger with an associated expansion valve for coupling with a coolant circuit of a heat source, wherein the components are connected by a refrigerant line. A refrigerant container is connected on the high-pressure side of the refrigerant compressor with the refrigerant line, with the device refrigerant container having a refrigerant-receiving chamber with a controllable volume, and a control unit controls the volume of the chamber of the refrigerant container as a function of operating parameters of the refrigerant circuit.

In this vehicle air conditioner according to the present invention, a controllable additional volume is realized in the refrigerant circuit in a high-pressure side refrigerant line section of the refrigerant line, wherein this line section is used in all modes of operation. This controllable additional volume is realized with a chamber of a refrigerant container having a controllable volume. The volume can be varied as needed, and the optimum operating point of the vehicle air conditioner and thus the optimal fill of the system can be adjusted.

According to an advantageous feature of the present invention, the chamber of the refrigerant container may be formed as a line section of the refrigerant line. In this way, the refrigerant flows permanently through the controllable volume of this chamber.

According to another advantageous feature of the present invention, the chamber of the refrigerant container may be connected to the refrigerant line via a branch line. In this way, refrigerant can be removed from the refrigerant circuit and stored in the chamber having the variable volume according to the adjusted volume.

According to another feature of the present invention, the refrigerant container may advantageously be constructed as a cylinder-piston arrangement, with the chamber being delimited by the piston of the cylinder-piston arrangement, wherein an imperfect seal between the piston and the cylinders of this cylinder-piston arrangement is desirable. Otherwise, another chamber of the cylinder-piston arrangement delimited by the piston may advantageously be connected via a suction line with the low-pressure side of the refrigerant compressor. The refrigerant collecting on the rear side of the piston is thereby returned to the refrigerant circuit, which is advantageously be implemented with a suction valve arranged in the suction line and connected for control to the control unit.

According to yet another advantageous feature of the present invention, one or more sensors may be arranged at the outlet of the refrigerant condenser in the flow direction of the refrigerant for determining the pressure and the temperature of the refrigerant as an operating parameter. These measured values of the pressure and the temperature are processed by the control unit, typically a controller, generating corresponding control signals for controlling the volume of the chamber of the refrigerant container and/or for controlling the branch valve.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
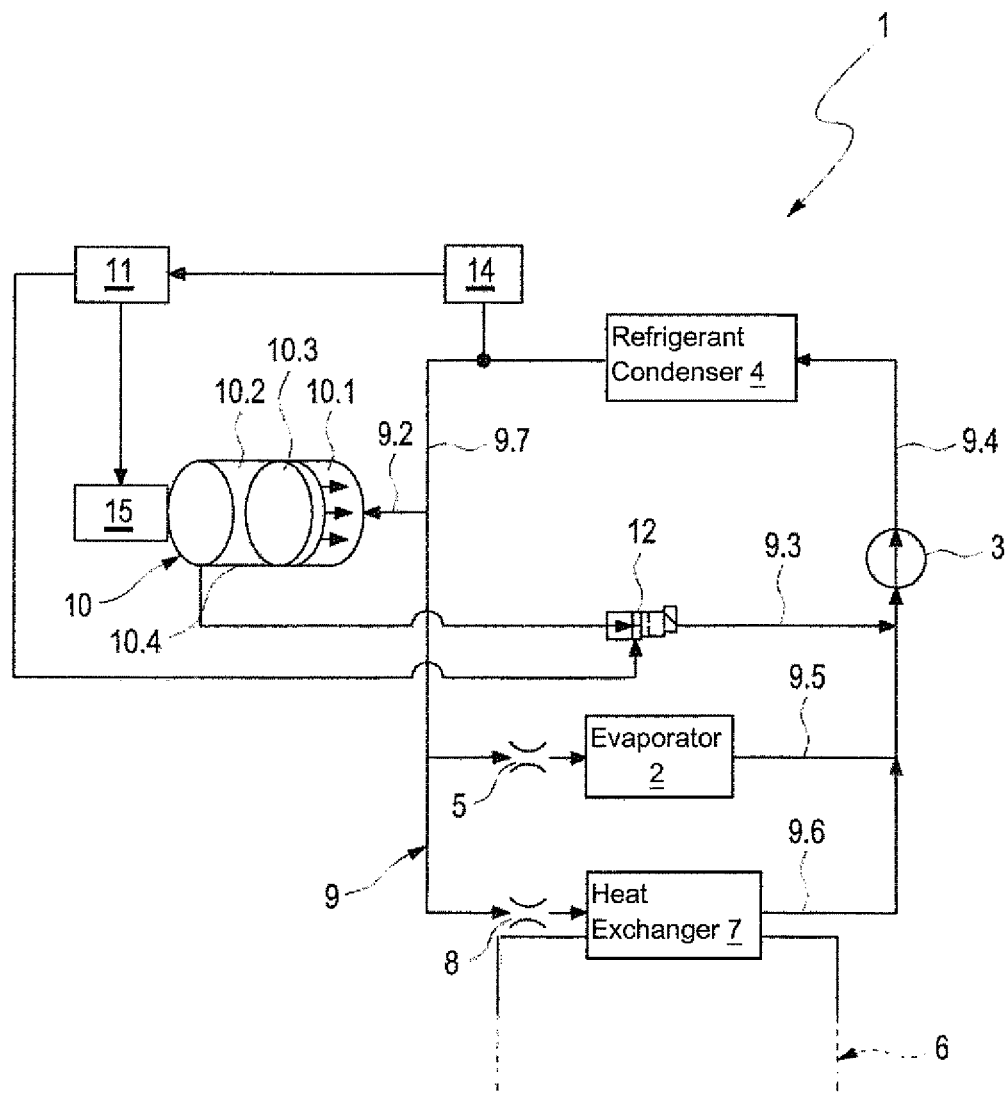
FIG. 1 is a schematic diagram of a refrigerant circuit of a vehicle air conditioner according to a first exemplary embodiment according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 2:
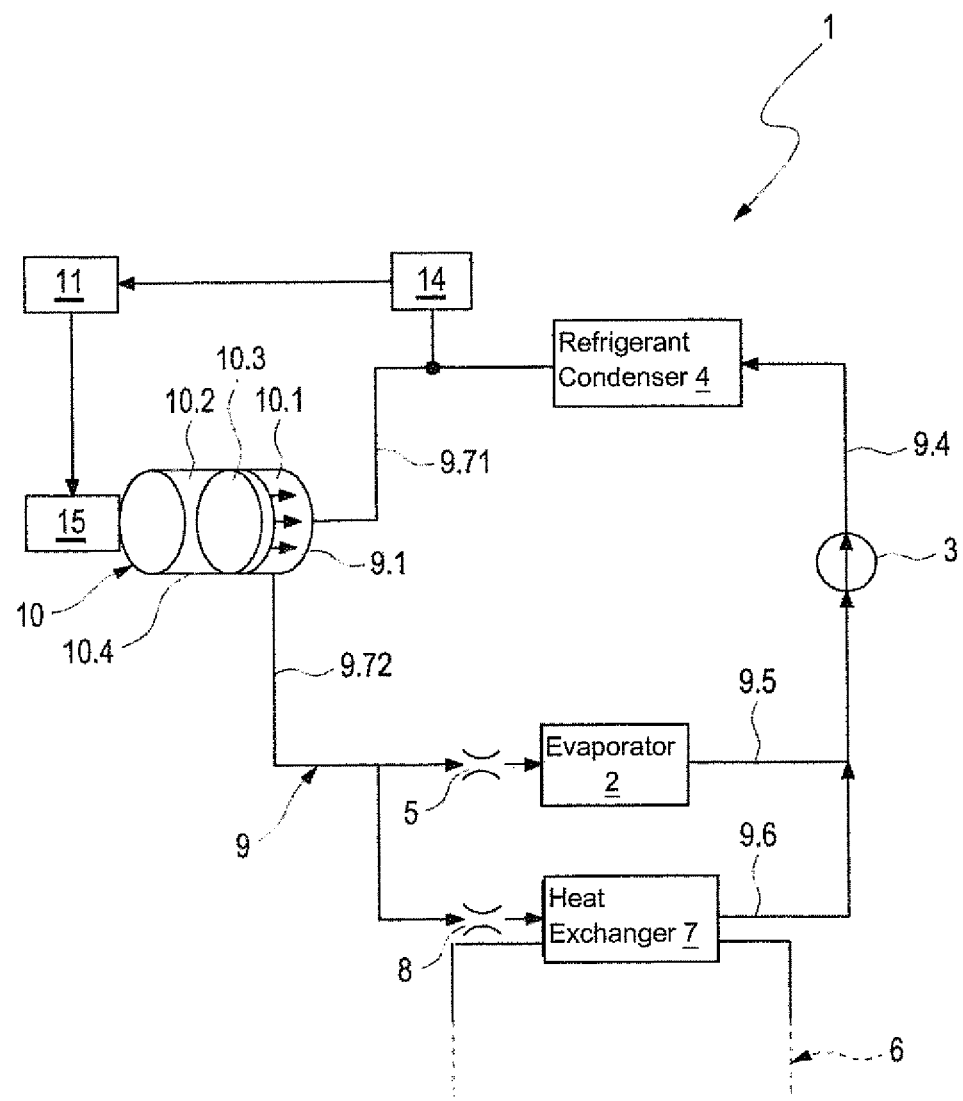
FIG. 2 is a schematic diagram of a refrigerant circuit of a vehicle air conditioner according to a second exemplary embodiment of the invention.

Turning now to the drawing, wherein FIGS. 1 and 2 each show a respective vehicle air conditioner of a vehicle (not shown) with a refrigerant circuit 1 having an identical basic structure.

The refrigerant circuit 1 of FIGS. 1 and 2 includes as components an evaporator 2 as an inner heat exchanger, a refrigerant compressor 3, a refrigerant condenser 4 as an outer heat exchanger, and an expansion valve 5 arranged upstream of the evaporator 2 in the flow direction of the refrigerant. Furthermore, the refrigerant circuit 1 includes a series circuit formed of a heat exchanger 7 as another evaporator and an expansion valve 8 associated with the heat exchanger 7, with the series circuit being arranged in parallel with the series circuit formed of the expansion valve 5 and the evaporator 2 in the refrigerant circuit 1. This heat exchanger 7 is connected to a coolant circuit 6 of a heat source (not shown) which may be, for example, a high-voltage battery or an electric motor. This heat exchanger 7 also operates as an evaporator for cooling an air flow as a coolant or as a chiller for cooling water as a coolant. The listed components are interconnected via a refrigerant line 9 to form the refrigerant circuit 1.

The high-pressure-side output of the refrigerant compressor 3 is connected with the refrigerant condenser 4 via a line section 9.4 of the refrigerant line 9, while the evaporator 2 and/or the heat exchanger 7 is connected with the low-pressure-side inlet of the refrigerant compressor 3 via a line section 9.5 or 9.6 of the refrigerant line 9.

The outlet of refrigerant condenser 4 is connected in the flow direction of the refrigerant via a line section 9.7 of the refrigerant line 9 to the expansion valve 5 associated with the compressor 2 and/or with the expansion valve 8 associated with the heat exchanger 7.

The refrigerant circuits 1 according to FIGS. 1 and 2 will now be explained in detail.

According to FIG. 1, a refrigerant container 10 constructed as a cylinder-piston arrangement is provided. A piston 10.3 movably supported In this cylinder-piston arrangement 10 divides the internal volume of the cylinder 10.4 of this cylinder-piston arrangement 10 in a chamber 10.1 and another chamber 10.2, wherein the volume of the chamber 10.1 can be controlled as a function of the position of the piston 10.3.

This chamber 10.1 with controllable volume is connected via a branch line 9.2 to the line section 9.7 of the refrigerant line 9 and thus represents a controllable additional volume for the refrigerant circuit 1. By adjusting the piston 10.3 of the refrigerant container 10, the volume of the chamber 10.1 can be either enlarged, with refrigerant being withdrawn from the refrigerant circuit 1 and stored in this chamber 10.1, or the volume of the chamber 10.1 can be reduced, with refrigerant being returned to the refrigerant circuit 1.

The position of the piston 10.3 the refrigerant container 10 is adjusted by a control device 15 of the refrigerant container 10 as a function of a control signal that is generated by a control unit 11 embodied as a controller as a function of operating parameters. These operating parameters are measured in form of a pressure and a temperature at the outlet of the refrigerant condenser 4 by a sensor 14, for example a pT sensor and supplied to the control unit 11 for evaluation. The control device 15 controls the movable piston 10.3 as a function of the measured sensor values.

The piston 10.3 is displaced as a function of the measured subcooling of the refrigerant at the outlet of the refrigerant condenser 4. When the subcooling is too high, e.g. greater than 15 K, the refrigerant circuit 1 is overfilled, so that a larger volume must be provided by the chamber 10.1 in which the refrigerant is stored by way of a suitable adjustment of the piston 10.3. Conversely, when the subcooling is too low, the volume is reduced and the stored refrigerant is returned to the refrigerant circuit 1. The control device 15 controls the piston 10.3 as a function of the measured values from pT sensor 14 and moves the piston 10.3 until the attained subcooling is acceptable.

The volume of the chamber 10.1 can hence be varied depending on the operating state of the refrigerant circuit 1, i.e. as necessary, and the optimum operating point with the optimum fill of the refrigerant circuit 1 with refrigerant can thus be adjusted.

Advantageously, the piston 10.3 of the cylinder-piston arrangement 10 should be tight against the cylinder 10.4. However, when a certain tightness is lacking, the refrigerant collected in the additional chamber 10.2 can be returned to the refrigerant circuit 1. This is realized according to FIG. 1 with a suction line 9.3 that connects the additional chamber 10.2 via a suction valve 12 with the low-pressure side of the refrigerant circuit 1, i.e. with the low-pressure-side inlet of the refrigerant compressor 3. The suction line 9.3 is hereby connected of the additional chamber 10.2 at the lowest point of the additional chamber 10.2.

FIG. 2 shows a refrigerant circuit 1 of a vehicle air conditioner, which is implemented with the same components as in FIG. 1, in particular also with a cylinder-piston arrangement as a refrigerant container 10, The only difference is that the cylinder-piston arrangement 10 is connected to the line section 9.7 of the refrigerant circuits 1 not via a branch line, but that the controllable volume of the chamber 10.1 forms a line section 9.1 of the line section 9.7, so that a line section 9.71 creates a connection between the outlet of the refrigerant condenser 4 and the chamber 10.1 in the flow direction of the refrigerant while another line section 9.72 connects the chamber 10.1 in the flow direction of the refrigerant to the expansion valves 5 and 8, wherein the outlet of the chamber 10.1 is provided at the lowest point of the chamber 10.1. Refrigerant thus flows permanently through the chamber 10.1.

The cylinder-piston arrangement 10 of the refrigerant circuit 1 according to FIG. 2 is controlled in the same manner as described in conjunction with FIG. 1. The properties of this refrigerant circuit 1 are also the same as those of the refrigerant circuit 1 of FIG. 1.

In the refrigerant circuits 1 according to FIGS. 1 and 2, the refrigerant container 10 is advantageously located at a "cool" location in the engine compartment of the vehicle to avoid re-evaporation of the stored refrigerant. The refrigerant container 10 is optimally incorporated at a point of the refrigerant circuit 1 that in terms of pressure below the level where the refrigerant is supplied to the refrigerant container 10, since a pressure drop supports the redistribution from the refrigerant circuit 1 to the refrigerant container 10.

The provision of a variable additional volume for the refrigerant circuit 1 by way of a refrigerant container 10 according to FIGS. 1 and 2 can of course also be used in refrigerant circuits that are equipped with a heat pump function, optionally with an additional heat pump condenser.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A vehicle air conditioner comprising:
   a refrigerant circuit comprising
   at least one evaporator,
   a refrigerant compressor,
   a refrigerant condenser,
   an expansion valve associated with the at least one evaporator,
   at least one heat exchanger with an associated expansion valve configured for connection to a coolant circuit of a heat source, and
   a refrigerant line interconnecting the at least one evaporator, the refrigerant compressor, the refrigerant condenser, the expansion valves and the at least one heat exchanger,
   a refrigerant container comprising a refrigerant-receiving chamber having a controllable volume and being connected to the refrigerant line on a high-pressure side of the refrigerant compressor, said refrigerant container being constructed as a cylinder-piston arrangement, wherein a piston of the cylinder-piston arrangement delimits the refrigerant-receiving chamber, wherein the cylinder-piston arrangement comprises an additional chamber delimited by the piston, with the additional chamber being connected to a low-pressure side of the refrigerant compressor via a suction line,
   a control unit configured to control the controllable volume of the refrigerant-receiving chamber in response to detected sub-cooling, and
   a pT sensor arranged at an outlet of the refrigerant condenser in a flow direction of the refrigerant and configured to determine a pressure and a temperature of the refrigerant as an operating parameter.

2. The vehicle air conditioner of claim 1, further comprising a branch line connecting the refrigerant-receiving chamber to the refrigerant line.

3. The vehicle air conditioner of claim 1, further comprising a suction valve arranged in the suction line and connected to the control unit.

* * * * *